US012711224B2

(12) United States Patent
Raz et al.

(10) Patent No.: US 12,711,224 B2
(45) Date of Patent: Aug. 18, 2026

(54) CYBERSECURITY POLICY ENFORCEMENT VIA CORRELATION BETWEEN ENTITIES AND RESOURCE ACCESS

(71) Applicant: Oasis Security Ltd., Tel Aviv (IL)

(72) Inventors: Ido Raz, Tel Aviv (IL); Aharon Fridman, Tel Aviv (IL)

(73) Assignee: Oasis Security Ltd., Tel Aviv (IL)

( * ) Notice: Subject to any disclaimer, the term of this patent is extended or adjusted under 35 U.S.C. 154(b) by 64 days.

(21) Appl. No.: 18/602,642

(22) Filed: Mar. 12, 2024

(65) Prior Publication Data

US 2025/0291902 A1 Sep. 18, 2025

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC ......................... G06F 21/554; G06F 2221/034
See application file for complete search history.

(56) References Cited

U.S. PATENT DOCUMENTS 9,251,633 B2 * 2/2016 Libal ....................... G06F 9/542
9,390,285 B1 * 7/2016 Dolas .................... G06F 21/604
10,063,654 B2 8/2018 Kirti et al.
10,911,470 B2 2/2021 Muddu et al.
11,165,800 B2 11/2021 Thampy
11,228,591 B2 1/2022 Karunakaran et al.
11,368,481 B2 6/2022 Kirti et al.
11,501,586 B1 * 11/2022 Rojas ................. G07C 9/00309
12,177,672 B2 * 12/2024 Buck ........................ H04L 63/20
2007/0094713 A1 * 4/2007 Venn ..................... G06F 21/105
726/4

(Continued)

FOREIGN PATENT DOCUMENTS

EP 4254873 A2 * 10/2023 ........... H04L 63/108
WO WO-2006031302 A2 * 3/2006 ............. H04L 63/20

(Continued)

OTHER PUBLICATIONS

"What is log correlation?", ManageEngine EventLog Analyzer (available at https://www.manageengine.com/products/eventlog/logging-guide/what-is-log-correlation.html) (last accessed Jan. 29, 2024, at 4:12 PM EST).

(Continued)

*Primary Examiner* — Christopher A Revak
(74) *Attorney, Agent, or Firm* — M&B IP Analysts, LLC

(57) ABSTRACT

A system and method for policy enforcement. A method includes extracting access properties for an access event from access data indicating the access event, wherein the access properties include a time of the access event and a source of a first entity which initiated the access event; correlating the access properties with entity data of a plurality of second entities in order to identify the first entity among the plurality of second entities, wherein the entity data indicates a source of each of the plurality of second entities at the time of the access event, wherein the source of each of the plurality of second entities is unique among the plurality of second entities; and applying a security policy based on the access event and the first entity identified as the entity which initiated the access event.

19 Claims, 4 Drawing Sheets

(56) References Cited

U.S. PATENT DOCUMENTS

| | | | | |
|---|---|---|---|---|
| 2017/0257397 | A1* | 9/2017 | Graham | H04L 63/20 |
| 2018/0176259 | A1* | 6/2018 | Eldar | H04L 63/20 |
| 2019/0251191 | A1* | 8/2019 | Bedadala | G06V 40/168 |
| 2020/0137097 | A1 | 4/2020 | Zimmermann et al. | |
| 2021/0211470 | A1* | 7/2021 | Wood | H04L 63/08 |
| 2022/0174097 | A1 | 6/2022 | Biswas et al. | |
| 2024/0106800 | A1* | 3/2024 | Kanza | H04L 63/0272 |
| 2024/0265130 | A1* | 8/2024 | Kacker | G06F 21/604 |
| 2025/0200583 | A1* | 6/2025 | Wheeler | G06Q 20/405 |

FOREIGN PATENT DOCUMENTS

| | | | | |
|---|---|---|---|---|
| WO | WO-2016022329 | A1 * | 2/2016 | H04L 63/0492 |
| WO | WO-2022010818 | A1 * | 1/2022 | H04L 63/107 |

OTHER PUBLICATIONS

Adcyber, "Uncover Cyber Threats: Log Correlation and Aggregation Explained," updated Jun. 17, 2023 (available at https://cyberinsight.co/what-is-log-correlation-and-aggregation/). Date retrieved Mar. 12, 2024.

* cited by examiner

CYBERSECURITY POLICY ENFORCEMENT VIA CORRELATION BETWEEN ENTITIES AND RESOURCE ACCESS

TECHNICAL FIELD

The present disclosure relates generally to securing computing environments using policies, and more specifically to enforcing policies using correlations between entities and resource access.

BACKGROUND

In modern computing environments, many resources may be deployed in order to deliver services. To support delivery of these services, resources may be assigned certain permissions to access other services and/or resources. In some cases, permissions may be assigned by assigning a role or other identity which has a set of predefined permissions such that entities assigned that identity can utilize the permissions of that identity in order to access resources and/or services. For example, a resource may be provided sign in credentials for a particular identity in order to enable that resource to assume that identity in order to access other resources.

Tracking access activities becomes more difficult to manage as more entities are deployed within a computing environment, particularly when identities are being assigned for this increasing number of entities. In particular, a provider of a service which manages access via sign in procedures may only provide sign in logs with limited information and, as a result, automated external tools (i.e., tools operated by entities which do not own or are otherwise a member of an organization using the computing environment) may face challenges in effectively identifying entities who are accessing different resources or services.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for policy enforcement. The method comprises: extracting access properties for an access event from access data indicating the access event, wherein the access properties include a time of the access event and a source of a first entity which initiated the access event; correlating the access properties with entity data of a plurality of second entities in order to identify the first entity among the plurality of second entities, wherein the entity data indicates a source of each of the plurality of second entities at the time of the access event, wherein the source of each of the plurality of second entities is unique among the plurality of second entities; and applying a security policy based on the access event and the first entity identified as the entity which initiated the access event.

Certain embodiments disclosed herein also include a non-transitory computer readable medium having stored thereon causing a processing circuitry to execute a process, the process comprising: extracting access properties for an access event from access data indicating the access event, wherein the access properties include a time of the access event and a source of a first entity which initiated the access event; correlating the access properties with entity data of a plurality of second entities in order to identify the first entity among the plurality of second entities, wherein the entity data indicates a source of each of the plurality of second entities at the time of the access event, wherein the source of each of the plurality of second entities is unique among the plurality of second entities; and applying a security policy based on the access event and the first entity identified as the entity which initiated the access event.

Certain embodiments disclosed herein also include a system for policy enforcement. The system comprises: a processing circuitry; and a memory, the memory containing instructions that, when executed by the processing circuitry, configure the system to: extract access properties for an access event from access data indicating the access event, wherein the access properties include a time of the access event and a source of a first entity which initiated the access event; correlate the access properties with entity data of a plurality of second entities in order to identify the first entity among the plurality of second entities, wherein the entity data indicates a source of each of the plurality of second entities at the time of the access event, wherein the source of each of the plurality of second entities is unique among the plurality of second entities; and apply a security policy based on the access event and the first entity identified as the entity which initiated the access event.

Certain embodiments disclosed herein include the method, non-transitory computer readable medium, or system noted above or below, wherein the entity data includes a plurality of network addresses of the plurality of second entities.

Certain embodiments disclosed herein include the method, non-transitory computer readable medium, or system noted above or below, wherein the source of the accessing entity is a network address of the accessing entity, wherein correlating the access properties with the entity data further comprises matching the network address of the accessing entity to a first network address of the plurality of network addresses of the plurality of second entities.

Certain embodiments disclosed herein include the method, non-transitory computer readable medium, or system noted above or below, further including or being configured to perform the following step or steps: sending a notification indicating the first entity which initiated the access event.

Certain embodiments disclosed herein include the method, non-transitory computer readable medium, or system noted above or below, wherein the first entity initiated the access event via an intermediary, further including or being configured to perform the following step or steps: identifying the intermediary based on the extracted access properties; and analyzing data of the intermediary in order to identify the source of the first entity and the time of the access event Certain embodiments disclosed herein include the method, non-transitory computer readable medium, or system noted above or below, where the intermediary is a secrets manager, wherein the data of the intermediary includes an access log of the secrets manager, wherein the access log of the secrets manager indicates the first entity as an entity which used the secrets manager during the access event.

Certain embodiments disclosed herein include the method, non-transitory computer readable medium, or system noted above or below, further including or being configured to perform the following step or steps: detecting a violation of the security policy based on the identified first entity.

Certain embodiments disclosed herein include the method, non-transitory computer readable medium, or system noted above or below, further including or being configured to perform the following step or steps: performing at least one remediation action based on the detected violation of the security policy.

Certain embodiments disclosed herein include the method, non-transitory computer readable medium, or system noted above or below, further including or being configured to perform the following step or steps: determining that the identified accessing entity is inactive, wherein the violation of the security policy is detected based on the inactive accessing entity initiating the access event.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
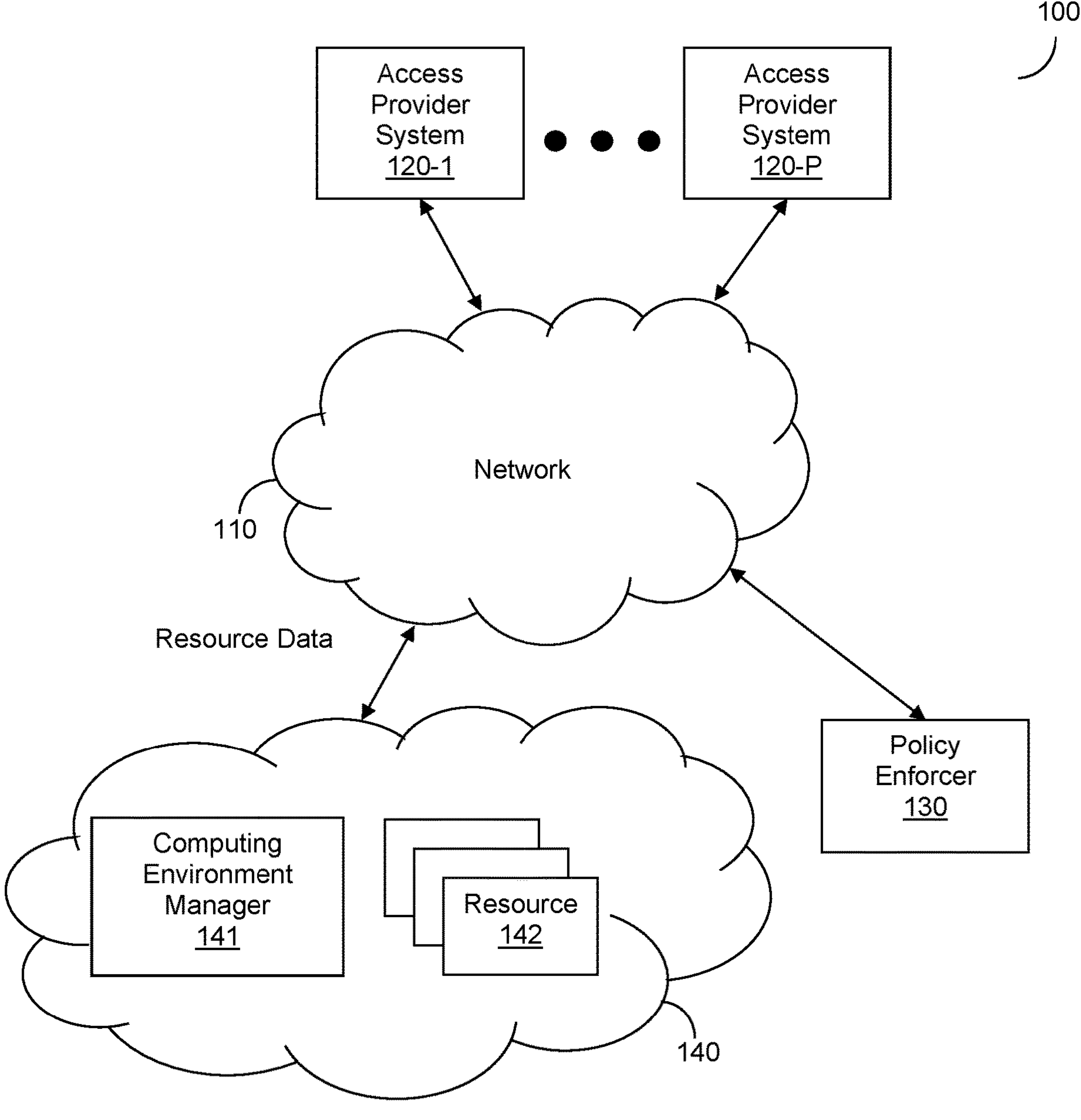
FIG. 1 is a network diagram utilized to describe various disclosed embodiments.

The various disclosed embodiments include techniques for cybersecurity policy enforcement which utilize correlation between identities and resource access in order to enforce policies. The disclosed embodiments utilize access data in forms such as logs (e.g., sign-in logs) in order to correlate access events with resources. The correlation allows for identifying entities that initiated respective access events which, in turn, may allow for enforcing policies or otherwise remediating potential cyber threats. More specifically, the disclosed processes allow for identifying resources that use certain secrets with only limited information as provided in access logs.

In an embodiment, access properties including source of an accessing entity and time of an access event are extracted from access data such as, but not limited to, access logs. Indirect access properties may be determined for an accessing entity which is not reflected explicitly in the access logs such as an accessing entity that accessed indirectly via an intermediary such as a secrets manager. That is, such indirect access properties may be or may include time and source (e.g., IP address) of an entity which accessed the secrets manager in order to indirectly access one or more applications. To this end, determining the indirect access properties may include identifying indirect access (e.g., via a secrets manager) and retrieving indirect access logs (e.g., sign in logs of the secrets manager) in order to determine the source and time of the resource which accessed the secrets manager.

The access properties are correlated with resource data indicating corresponding properties of known resources. For example, when log data indicates a sign in from an Internet Protocol (IP) address at a time, a resource known to have that IP address at that time may be determined as the accessing entity by correlating the IP addresses and times. The access properties may further include, but are not limited to, application(s) accessed, accessing entity configuration information (e.g., operating system, browser, etc.), geolocation, and the like. Based on the correlation, the resource which is represented in the access log is identified. The identified resource may be used to generate a notification in order to provide visibility regarding resources which initiated different access events.

Once an entity has been identified as an accessing entity with respect to the access logs, one or more security policies may be applied in order to determine whether the access event indicated in the access logs violates the security policies. As a non-limiting example, when a virtual machine identified as initiating an access event is determined to be inactive, the access event may be identified as a violation of a security policy and may be remediated by terminating the inactive virtual machine or preventing future access events involving the inactive virtual machine. When such a violation is detected, appropriate remedial action may be performed in order to mitigate or otherwise remediate the violation. Alternatively or in combination, remediation actions may be prioritized based on access, for example, by prioritizing remediating policy violations related to resources which have access to higher numbers of applications.

FIG. 1 shows an example network diagram 100 utilized to describe the various disclosed embodiments. In the example network diagram 100, access provider systems 120-1 through 120-P (hereinafter referred to as an access provider system 120 or access provider systems 120), a policy enforcer 130, and components of a computing environment 140 communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The access provider systems 120 are owned or operated by access provider entities who deliver access provisioning services. These services may require signing in or otherwise logging in before resources are granted access to other resources, services, and the like. To this end, the access provider systems 120 may generate, store, or otherwise collect access data such as, but not limited to, log in or sign in data. Such access data indicates information related to access events (e.g., log ins or sign ins) which may include, but is not limited to, location-based information (e.g., Internet Protocol address), access time (e.g., time at which a log in or sign in started or was completed), access credentials used, and the like. In accordance with various disclosed embodiments, the access data may include Internet Protocol address and access time, which may be utilized by the policy enforcer 130 as discussed therein for correlating identities to resource access.

The policy enforcer 130 is configured to correlate identities to resource access (e.g., resource access as realized through access events) and to enforce policies based on the correlations as discussed herein. Specifically, entities such as computing entities 142 operating in a cloud computing environment or other computing environment such as the computing environment 140 may access other resources among the entities 142, services (not shown), or both, where such access is managed by the access provider systems 120. The entities 142 may be, for example but not limited to, computing entities which may consume services or otherwise access resources and may be, but are not limited to, resources such as virtual machines, software containers, and the like.

A computing environment manager 141 may manage the computing environment 140 and provide data related to the entities 142 to the policy enforcer 130 for use in correlating identities to access events. Such resource data may include, but is not limited to, location-based data such as IP addresses for respective resources among the entities 142.

Each of the entities 142 may initiate access events as discussed herein, may be accessed as a result of access events as discussed herein, or both. Accordingly, at least some of the resources among the entities 142 may act as accessing entities as described herein such that data related to the resources among the entities 142 may be correlated with access properties in order to identify usage of identities (i.e., using identities to obtain access) by the resources among the entities 142 as described herein.

It should be noted that the example network diagram 100 is shown merely for illustrative purposes and without limitation on the disclosed embodiments. In particular, a single computing environment is depicted for simplicity purposes, but the disclosed embodiments may be equally utilized to enforce policies within or across multiple computing environments. Likewise, a single policy enforcer 130 is depicted in FIG. 1, but the disclosed embodiments may be realized via multiple policy enforcers each of which performs certain iterations of the processes described herein.

Figure 2:
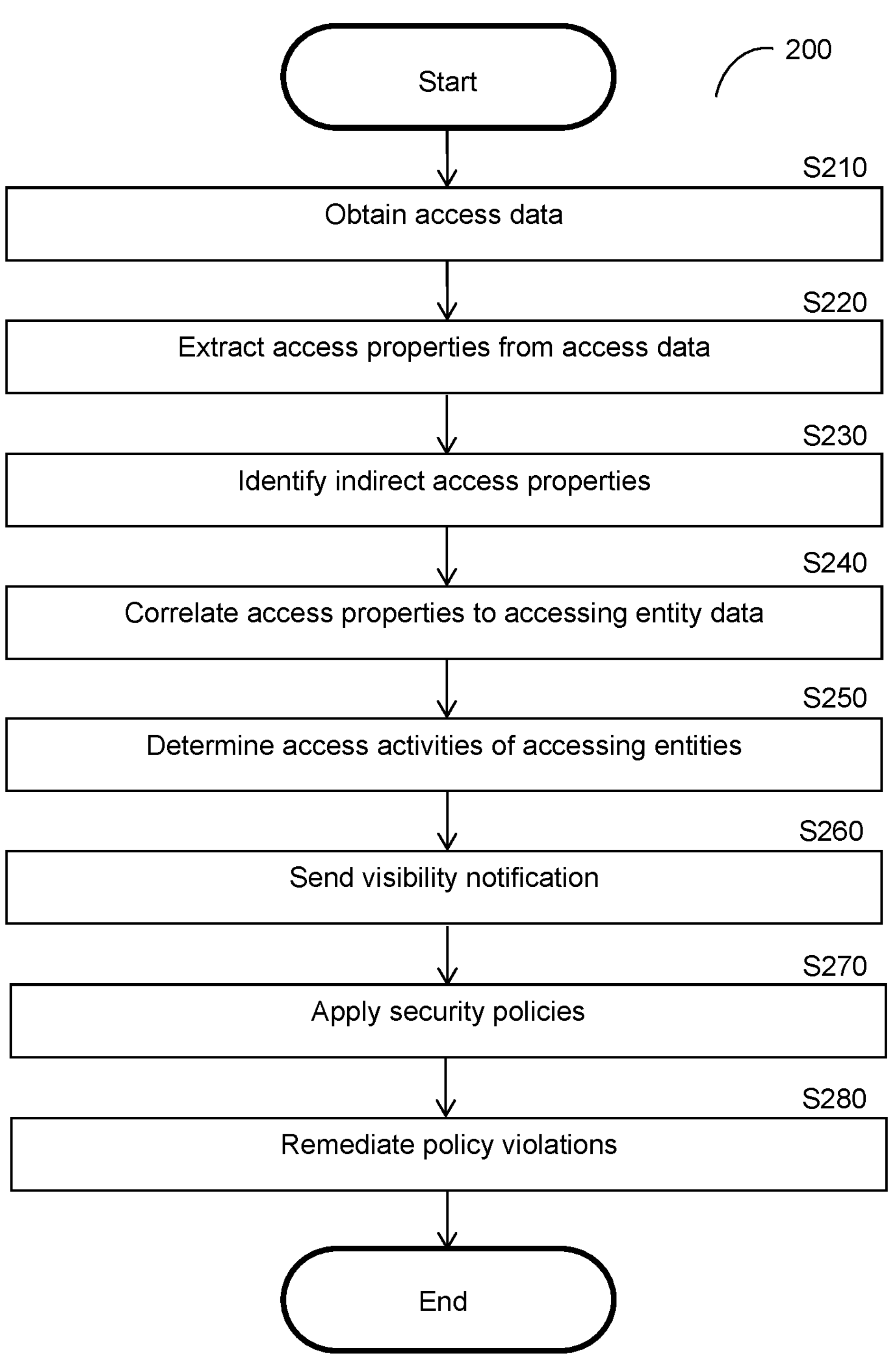
FIG. 2 is a flowchart illustrating a method for enforcing policies using correlation between identities and resource access according to an embodiment.

FIG. 2 is a flowchart 200 illustrating a method for enforcing policies using correlation between identities and resource access according to an embodiment. In an embodiment, the method is performed by the policy enforcer 130, FIG. 1.

At S210, access data is obtained. The access data may include, but is not limited to, log data or other data indicating access events such as log in or sign in events. In particular, the log data indicates at least sources of accessing entities participating in access events as well as times for each of the access events. Each of these accessing entities may be the accessing entity who initiated the access event, or may be an intermediary through which another target entity participated in the access event. When an intermediary is used by the target entity to initiate the access event indirectly, the access data may indicate information identifying the intermediary which, in turn, may be utilized to identify appropriate data of the intermediary in order to determine the target entity as described further below.

The sources of the accessing entities may be defined with respect to locations such as, but not limited to, network addresses, geographic locations, a combination thereof, and the like. In particular, it is noted that Internet Protocol (IP) addresses are a type of network address which identifies a given entity sufficiently uniquely to enable effectively correlating the entity to a given access event when log data for the access event indicates an IP address of the accessing entity. The time for each access event may be a time at which access was attempted (e.g., a time at which credentials were transmitted for authentication or when a request for access was transmitted as indicated in a timestamp for data packets including such credentials or request) or a time at which access was completed (e.g., a time at which access was granted to the accessing entity).

At S220, access properties are extracted from the access data with respect to access events represented in the access data. Each access event includes an attempt to access a service, a resource, both, and the like. At least some of the access events may include authentication, for example, through a log in or sign in procedure in which credentials (e.g., username and password or keys) are provided. For such authentication-based access events, access to one or more services and/or resources is granted upon an authentication system being provided the applicable credentials. As noted above, access provider systems (e.g., the access provider systems 120, FIG. 1) may store data related to access events such as data about the entity attempting access (e.g., a location of a resource attempting to access another resource or a service), about the circumstances of the access (e.g., a time at which credentials were submitted or access was otherwise initiated, or a time at which access was granted or otherwise completed).

In an embodiment, the access properties to be extracted include location-based access properties and time-based access properties. In a further embodiment, the location-based access properties include a network address such as, but not limited to, an Internet Protocol (IP) address. In another embodiment, the time-based access properties include a time at which an access event was initiated or a time at which the access event was completed (e.g., when access is granted).

At optional S230, indirect access properties are identified based on the access data. The indirect access properties include access properties of an indirect access event, i.e., an access event which is an intermediate step before accessing a service or resource in another access event. As a non-limiting example, an indirect access event may include accessing a secrets manager which manages access to such other service or resource. The indirect access event involves accessing an intermediate service or resource other than the target service or resource, where accessing the intermediate service or resource allows for access to the underlying target service or resource. In other words, the indirect access event involves accessing a target service or resource through another service or resource rather than accessing the target service or resource directly.

The indirect access properties may represent an entity which is not explicitly indicated in the access data. For example, when the access event is performed via a secrets manager, the secrets manager may be indicated as the accessing entity in the access logs. However, the secrets manager is not the underlying target accessing entity which actually initiated the access event and is, instead, an intermediate accessing entity used to facilitate and/or manage access. To this end, in some embodiments, identifying the indirect access properties may include determining that the accessing entity indicated explicitly in the access logs is an intermediate accessing entity, and analyzing indirect access data for the intermediate accessing entity in order to identify the indirect access properties. Such indirect access data may include, but is not limited to, secrets manager logs indicating information related to use of the secrets manager (e.g., times of requests sent to the secrets manager, sources of entities which used the secrets manager, etc.). When indirect access properties are utilized, the source and time extracted for use in correlation as discussed herein may be extracted from the indirect access data.

In some embodiments, S230 further includes determining an identity used for the indirect access. As a non-limiting example, when the indirect access of an access event includes accessing a secrets manager in order to gain access to another resource or service, the determined identity may be the identity used to access the secrets manager.

The identity may be, for example, a device identity or other identity which may be assigned to a given computing entity in order to facilitate access by that entity to one or more resources, services, and the like. As a non-limiting example, the identity may be a role associated with certain permissions that, when assigned to an entity, grants the entity the associated permissions. In accordance with various disclosed embodiments, such associated permissions include permissions for accessing predetermined target resources or services, and may further include permissions with respect to intermediate services or resources such as secrets managers used for indirectly accessing the target resources or services.

At S240, the access properties extracted at S220, identified at S230, or both, are correlated to accessing entity data related to respective computing entities such as, but not limited to, resources in one or more computing environments. In an embodiment, the access properties which are used to correlate with the accessing entity data include at least source-identifying access properties indicating a source of the entity initiating the access event as well as time-identifying access properties indicating a time of the access event. The source of the accessing entity and time of a given access event may be correlated to known sources for respective entities at that time in order to determine which of those entities was the accessing entity that initiated that access event.

More specifically, the source-identifying access properties may be or may include location-based indications of source, i.e., indicating a source location from which an entity initiated an access event. Such location-based indications of source may include, but are not limited to, network addresses (e.g., IP addresses), geographic locations, specific networks or subnetworks, combinations thereof, portions thereof, and the like.

As a non-limiting example, an IP address of an entity which initiated an access event in a given computing environment at a particular time are correlated with resource data indicating known IP addresses of respective entities operating within the computing environment at that time in order to determine which entity initiated the access event.

In this regard, it is noted that many cyber threats are realized by abusing identity assignments, permissions, or secrets in a manner that allows attackers to improperly gain access to resources or services in computing environments. It is also noted that access logs are often managed by third-party access service providers who do not have full information regarding the entities which are accessing their services such that the access logs cannot provide the full context regarding use of identities, permissions, secrets, and the like. However, access logs often contain information which has been identified as being capable of use for indirectly identifying the accessing entity. In particular, information such as a source (e.g., an IP address) of the entity which attempted to access at a particular time can be correlated to known sources of entities operating in or with a computing environment in order to identify which entity in the access event.

It has further been identified that abuse of identity assignments, permissions, and secrets is often context-dependent. That is, certain uses of identities, assignments, or permissions may be benign if performed by certain entities, types of entities, or entities having certain configurations, while being harmful if performed by entities that do not meet such criteria.

An example process for correlating access properties to computing entities is described further below with respect to FIG. 3.

At S250, access activities of respective entities are determined based on the correlation. The access activities include, but are not limited to, initiating access events by at least attempting to access resources, services, or both, within a computing environment, or by using an intermediary in order to attempt an access. The determined access activities may further include whether the entity which initiated each access event was successfully granted access.

In some embodiments, S250 may further include grouping the determined access activities. More specifically, the access activities may be grouped with respect to characteristics of the respective entities which initiated the access events of these access activities. As non-limiting examples, the access activities may be grouped based on access events initiated by entities of the same type (e.g., virtual machine, software container, etc.), assigned to the same identity or to identities among a predefined group of identities, entities deployed in the same area within the computing environment, and the like. Grouping the access activities based on the entities which initiated access events may allow for providing visibility into entities whose access activities are more likely to be related.

At optional S260, a visibility notification is generated and sent. In an embodiment, the visibility notification includes information related to the access events represented in the access data. To this end, the visibility notification may indicate, for example, that a certain entity accessed or attempted to access a resource or service from a specific location (e.g., a specific IP address) at a particular time.

At S270, one or more security policies are applied based on the determined access activities. To this end, the security policies may define allowable activities, forbidden activities, or both. Each allowable or forbidden activity may be further defined with respect to specific entities, types of entities, groupings of entities, combinations thereof, and the like. Alternatively or in combination, the security policies may be defined with respect to criteria for allowable configurations, statuses (e.g., active or inactive), identities (e.g., roles), combinations thereof, and the like. To this end, in an embodiment, applying the security policies may further include determining configurations, statuses, or both, of accessing entities represented in the access activities.

As a non-limiting example, a security policy may define that a virtual machine having a status of inactive should not be signing in for access such that an access event including an inactive virtual machine signing in to access a service or other resource may be detected as a violation of the security policy. As another non-limiting example, a security policy may define that a software container should not be accessing resources or services if the software container is not an instance of an image having a latest version of a particular piece of software such that an access event involving such a software container based on an outdated image may be detected as a violation of the security policy.

In an embodiment, the status of an entity as being either active or inactive is determined based on a period of time since a last activity performed by the entity. In a further embodiment, if a period of time since a last activity performed by a given entity is above a predetermined threshold, the entity is determined as having a status of inactive;

otherwise, the entity is determined to be active. In yet a further embodiment, the period of time may be measured since a last activity of a certain type (e.g., a last access activity such as a last initiation of an access event). As discussed herein, security policies may be defined with respect to active or inactive status so as to detect instances where entities which are inactive attempt to access other resources or services, which is more likely to be caused by a cyber threat or other malicious activity.

At optional S280, policy violations are remediated for any security policies which were violated during the determined access activities. In an embodiment, S280 includes performing one or more remediation actions such as, but not limited to, revoking access revoking identity assignments, sending notifications to owners of the accessing entity, changing access permissions, ceasing communications, adding the accessing entity to a blacklist (e.g., a list of forbidden entities for a secrets manager to serve), combinations thereof, portions thereof, and the like.

In some embodiments, the remediation actions may be prioritized based on one or more prioritization factors defined with respect to the accessing entity. Such prioritization factors may include, but are not limited to, a number of identities assigned to the accessing entity. As a non-limiting example, violations of policies may be prioritized in order to remediate policy violations initiated by entities which are assigned a higher number of identities than policy violations initiated by entities which are assigned lower numbers of identities. In this regard, it is noted that entities which are assigned a higher number of identities can, on average, be utilized to cause more harm (or cause harm more quickly) than entities assigned lower numbers of identities. Accordingly, prioritizing remediation based on the number of assigned identities allows for improving cybersecurity via policy enforcement by remediating policy violations related to entities which are capable of causing more harm.

Figure 3:
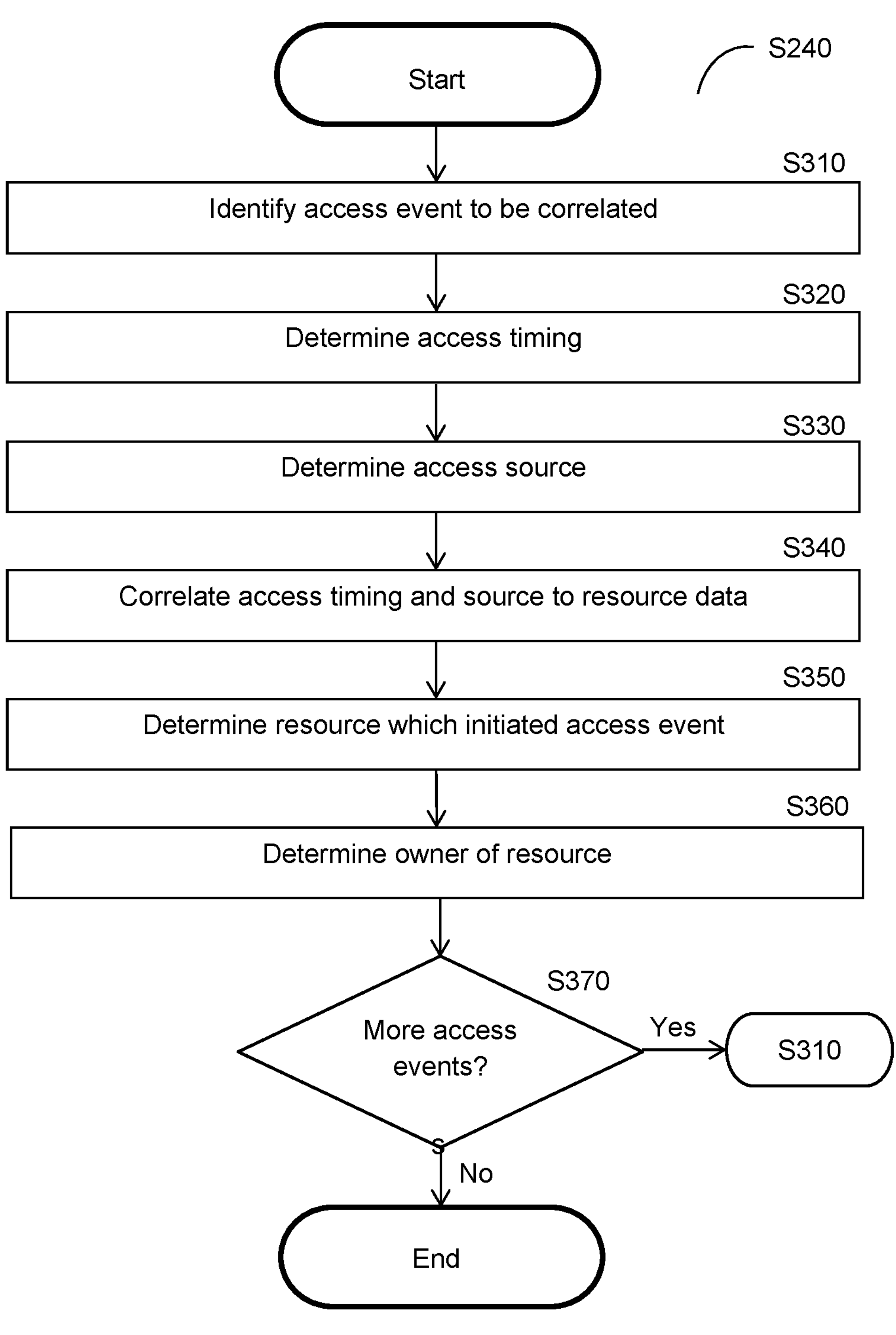
FIG. 3 is a flowchart illustrating a method for correlating identities with resource access according to an embodiment.

FIG. 3 is a flowchart S240 illustrating a method for correlating identities with resource access according to an embodiment.

At S310, an access event to be correlated is identified. The access event includes at least an attempt by an entity to access a resource, service, combination thereof, and the like. The access event may be the access event discussed above with respect to FIG. 2.

At S320, a time of the access event is determined based on access data related to the access event. The time of the access event may be, but is not limited to, a time at which the access event was initiated (e.g., a time at which a request for access was sent, for example as indicated in a timestamp for such a request), a time at which access was granted, a time range (e.g., a time range starting with the initiation of the access event and ending with the access being granted), and the like.

When the access event involves accessing resources or services via an intermediary such as a secrets manager, the time of the access event may be determined with respect to timing of activities related to use of the intermediary. As a non-limiting example, when an access event involves a secrets manager requesting access, logs of that secrets manager may indicate which entities used the secrets manager at respective times, which uses of the secrets manager resulted in which access events, or both. These secrets manager logs may therefore be analyzed to determine a time at which the secrets manager was used, and that time may be utilized as the time of the access event. This time at which the secrets manager was used will correspond to the source of the entity which used the secrets manager, which can be leveraged in order to accurately correlate entities to access events indirectly as discussed herein.

At S330, a source is determined based on the access data related to the access event. The source may be a source of the accessing entity that initiated the access event by directly participating in the access event (e.g., as indicated in the access data), or a target accessing entity which indirectly participated in the access event through an intermediary and initiated the access event by communicating with the intermediary (e.g., as determined by matching a source indicated in the access data to a known source of an intermediary), and the like.

In some embodiments, the source is determined as or based on a source identifier which uniquely identifies a specific entity (e.g., a specific device, system, or program). For example, access logs may indicate IP addresses of entities which participated in access events, where each IP address is uniquely assigned to a given device at a particular time. That is, in such an embodiment, the source is determined such that only the accessing entity would have that source at the time determined at S320, and no other entity would have that source. Alternatively, uniqueness may be defined with respect to a given computing environment or set of computing environments such that a source identifier uniquely identifies an entity when only one entity within the computing environment or set of computing environments has that source identifier at any given time. In other words, the source of each entity among a set of entities in a computing environment or set of computing environments is unique among that set of entities such that no two entities among the set of entities have the same source (e.g., as indicated by their respective source identifiers).

Because IP addresses may be changed over time (e.g., a given device's IP address might change and/or different devices may be assigned different IP addresses at different times), correlating both the source in the form of an IP address and the time of the access event to known IP addresses of entities at a respective point in time allows for accurately correlating accessing entities to entities within a computing environment.

As noted above, in some embodiments, indirect access data may be identified using data directly indicating the access event. In such embodiments, the indirect access data such as, but not limited to, secrets manager logs, may be used to determine the time at S320, the source at S330, or both. To this end, in such an embodiment, S320, S330, or both, includes analyzing such indirect access data in order to identify a source of a target accessing entity which used an intermediate accessing entity, or intermediary, in order to participate in the access event. That is, the entity which used a secrets manager or other intermediary in order to attempt to access a service or resource would be the target entity, and the source of the target entity at a given time may be extracted using logs from that intermediary in order to determine the underlying accessing entity rather than the intermediary. When an intermediary is used, information related to the underlying target entity is not explicitly indicated in the access data for the access event and, instead, may be indicated in logs or other data of the intermediary (e.g., log data of a secrets manager indicating which entities used the secrets manager at which times).

In this regard, it is noted that the entity actually accessing a given resource or service is not always the entity of concern in a cyber-attack. Specifically, a secrets manager or other intermediary may facilitate or manage access for many underlying target entities that use the intermediary in order to obtain access. Security policies intended to detect misuse may result in false negatives because the activities of the intermediary may meet all applicable requirements even when the activities by the entity who actually initiated the access event through the intermediary violate the policies. As a result, applying security policies designed for initiating entities to secrets managers or other such intermediaries would result in failing to detect at least some violations. In other words, the intermediary activities may be benign out of context such that applying policies based on information related to these intermediaries would result in false negatives with respect to policy violations.

By using indirect access data to identify the underlying target entity, policies can be enforced in a manner that reduces false negative policy violations and, consequently, improves the cybersecurity of computing environments secured using these policies. Accordingly, using the access data in order to identify such an intermediary and analyzing indirect access data of that intermediary allows for determining information such as a source and time of access for an appropriate target entity (e.g., the entity which initiated the access event indirectly through the intermediary) which, in turn, allows for improving cybersecurity of computing environments in which the policies are enforced.

At S340, the access properties are correlated to entity data of entities deployed in or otherwise operating with respect to a computing environment. Specifically, the source of the accessing entity and the time of the access event are correlated to known sources of entities at respective times for the computing environment. The correlation results in a match between an access event and a specific entity, which is identified as the accessing entity which initiated (either directly or indirectly) the access event. Identifying which entity initiated the access event allows for applying policies defined with respect to allowable or forbidden access activities for entities having different types, configurations, statuses, and the like, as described herein.

When the access event involves indirect access, the source of the accessing entity and the time of the access event which are used for the correlation may be a source of a target accessing entity which used an intermediary to participate in the access event as well as a time at which the target accessing entity used the intermediary.

As noted above, correlating the source of an accessing entity at a given time to a known source of an entity in a computing environment at that time allows for uniquely identifying which entity among the computing environment initiated the access event, which in turn allows for applying access-related policies defined with respect to factors such as, but not limited to, access activities performed, a type of the accessing entity, a configuration of the accessing entity, a status of the accessing entity (e.g., active or inactive), a combination thereof, and the like.

At S350, a resource which initiated the access event is determined based on the correlation. In an embodiment, S350 includes at least matching a source of the accessing entity that initiated the access event to a known source for an entity in a computing environment at a time of the access event. That is, an entity in a computing environment having the same source at the same time as the entity identified as the accessing entity for the accessing event is determined to be that accessing entity, which in turn allows for enforcing policies based on known characteristics, configurations, statuses, or other aspects of entities among the computing environment as discussed herein.

At optional S360, an owner of the entity which initiated the access event is determined. In an embodiment, identifying the owner of the initiating entity includes checking a predetermined list of known owners. In a further embodiment, the list is a list of known owners for respective entities. As a non-limiting example, for a virtual machine entity, an owner may be assigned to that virtual machine and the ownership may be represented in a list of resource owners.

In another embodiment, the determined owner may be an owner of an identity used by the initiating entity in order to initiate or otherwise participate in the access event. In such an embodiment, list may be a list of known owners for respective identities At S370, it is determined whether more access events are to be analyzed for potential correlations and, if so, execution continues with S310; otherwise, execution terminates.

Figure 4:
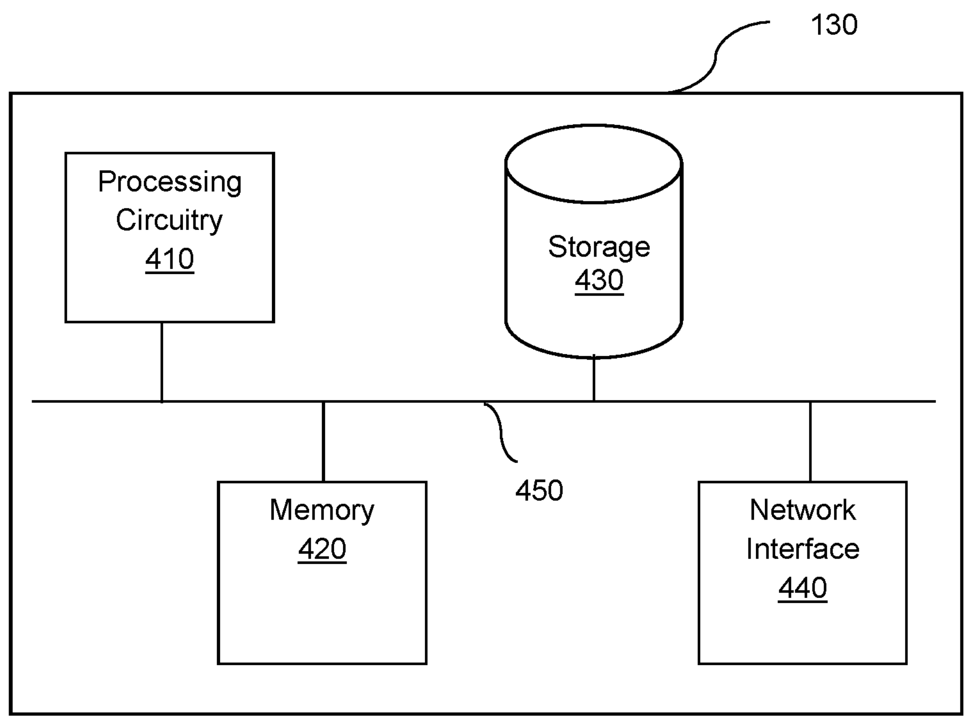
FIG. 4 is a schematic diagram of a policy enforcer according to an embodiment.

FIG. 4 is an example schematic diagram of a policy enforcer 130 according to an embodiment. The policy enforcer 130 includes a processing circuitry 410 coupled to a memory 420, a storage 430, and a network interface 440. In an embodiment, the components of the policy enforcer 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read-only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the policy enforcer 130 to communicate with other systems, devices, components, applications, or other hardware or software components, for example as described herein.

It should be understood that the embodiments described herein are not limited to the specific architecture illustrated in FIG. 4, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 20; 3A; A and B in combination; B and C in combination; A and C in combination; A, B, and C in combination; 2A and C in combination; A, 3B, and 2C in combination; and the like.

What is claimed is:

1. A method for policy enforcement, comprising:

extracting access properties for an access event from access data indicating the access event, wherein the access properties include a time of the access event and a source of a first entity which initiated the access event;

correlating the access properties with entity data of a plurality of second entities in order to identify the first entity among the plurality of second entities, wherein the entity data indicates a corresponding source of each of the plurality of second entities at the time of the access event, wherein the source of each of the plurality of second entities is unique among the plurality of second entities such that only the second entity among the plurality of second entities has the corresponding source at the time of the access event, wherein the source of each of the plurality of second entities is determined based on a source identifier that uniquely identifies the corresponding second entity; and applying a security policy based on the access event and the first entity identified as the first entity which initiated the access event.

2. The method of claim 1, wherein the entity data includes a plurality of network addresses of the plurality of second entities.

3. The method of claim 2, wherein the source of the first entity is a network address of the first entity, wherein correlating the access properties with the entity data further comprises matching the network address of the accessing entity to a first network address of the plurality of network addresses of the plurality of second entities.

4. The method of claim 1, further comprising:

determining at least one access activity based on the correlation, wherein the at least one access activity is performed in order to at least attempt to access a resource by the first entity; and sending a notification indicating the first entity which initiated the access event and the resource that the first entity attempted to access via the at least one access activity.

5. The method of claim 1, wherein the first entity initiated the access event via an intermediary, further comprising:

identifying the intermediary based on the extracted access properties; and analyzing data of the intermediary in order to identify the source of the first entity and the time of the access event.

6. The method of claim 5, where the intermediary is a secrets manager, wherein the data of the intermediary includes an access log of the secrets manager, wherein the access log of the secrets manager indicates the first entity as an entity which used the secrets manager during the access event.

7. The method of claim 1, further comprising:

detecting a violation of the security policy based on the identified first entity.

8. The method of claim 7, further comprising:

performing at least one remediation action based on the detected violation of the security policy.

9. The method of claim 7, further comprising:

determining that the identified accessing entity is inactive, wherein the violation of the security policy is detected based on the inactive accessing entity initiating the access event.

10. A non-transitory computer readable medium having stored thereon instructions for causing a processing circuitry to execute a process, the process comprising:

extracting access properties for an access event from access data indicating the access event, wherein the access properties include a time of the access event and a source of a first entity which initiated the access event;

correlating the access properties with entity data of a plurality of second entities in order to identify the first entity among the plurality of second entities, wherein the entity data indicates a corresponding source of each of the plurality of second entities at the time of the access event, wherein the source of each of the plurality of second entities is unique among the plurality of second entities such that only the second entity among the plurality of second entities has the corresponding source at the time of the access event, wherein the source of each of the plurality of second entities is determined based on a source identifier that uniquely identifies the corresponding second entity; and applying a security policy based on the access event and the first entity identified as the first entity which initiated the access event.

11. A system for policy enforcement, comprising:

a processing circuitry; and a memory, the memory containing instructions that, when executed by the processing circuitry, configure the system to:

extract access properties for an access event from access data indicating the access event, wherein the access properties include a time of the access event and a source of a first entity which initiated the access event;

correlate the access properties with entity data of a plurality of second entities in order to identify the first entity among the plurality of second entities, wherein the entity data indicates a corresponding source of each of the plurality of second entities at the time of the access event, wherein the source of each of the plurality of second entities is unique among the plurality of second entities such that only the second entity among the plurality of second entities has the corresponding source at the time of the access event, wherein the source of each of the plurality of second entities is determined based on a source identifier that uniquely identifies the corresponding second entity; and apply a security policy based on the access event and the first entity identified as the entity which initiated the access event.

12. The system of claim 11, wherein the entity data includes a plurality of network addresses of the plurality of second entities.

13. The system of claim 12, wherein the source of the first entity is a network address of the first entity, wherein correlating the access properties with the entity data further comprises matching the network address of the accessing entity to a first network address of the plurality of network addresses of the plurality of second entities.

14. The system of claim 11, wherein the system is further configured to:

determine at least one access activity based on the correlation, wherein the at least one access activity is performed in order to at least attempt to access a resource by the first entity; and sending a notification indicating the first entity which initiated the access event and the resource that the first entity attempted to access via the at least one access activity.

15. The system of claim 11, wherein the first entity initiated the access event via an intermediary, wherein the system is further configured to:

identify the intermediary based on the extracted access properties; and analyze data of the intermediary in order to identify the source of the first entity and the time of the access event.

16. The system of claim 15, where the intermediary is a secrets manager, wherein the data of the intermediary includes an access log of the secrets manager, wherein the access log of the secrets manager indicates the first entity as an entity which used the secrets manager during the access event.

17. The system of claim 11, wherein the system is further configured to:

detect a violation of the security policy based on the identified first entity.

18. The system of claim 17, wherein the system is further configured to:

perform at least one remediation action based on the detected violation of the security policy.

19. The system of claim 17, wherein the system is further configured to:

determine that the identified accessing entity is inactive, wherein the violation of the security policy is detected based on the inactive accessing entity initiating the access event.

* * * * *